(12) United States Patent
Leech et al.

(10) Patent No.: US 8,925,952 B2
(45) Date of Patent: Jan. 6, 2015

(54) TRUCK BED HITCH ATTACHMENT

(71) Applicant: Curt Manufacturing, LLC, Eau Claire, WI (US)

(72) Inventors: Cody James Leech, Stanley, WI (US); Kristopher William Schwennsen, Mondovi, WI (US); Scott Morrison, Eau Claire, WI (US)

(73) Assignee: Curt Manufacturing, LLC, Eau Claire, WI (US)

( * ) Notice: Subject to any disclaimer, the term of this patent is extended or adjusted under 35 U.S.C. 154(b) by 0 days.

(21) Appl. No.: 14/021,839

(22) Filed: Sep. 9, 2013

(65) Prior Publication Data

US 2014/0015224 A1  Jan. 16, 2014

Related U.S. Application Data

(62) Division of application No. 13/205,438, filed on Aug. 8, 2011, now Pat. No. 8,550,485.

(60) Provisional application No. 61/371,577, filed on Aug. 6, 2010, provisional application No. 61/376,895, filed on Aug. 25, 2010.

(51) Int. Cl.
*B60D 1/07* (2006.01)
*B60D 1/52* (2006.01)
*B62D 53/08* (2006.01)

(52) U.S. Cl.
CPC . *B60D 1/52* (2013.01); *B62D 53/08* (2013.01)
USPC ............... 280/416.1; 280/415.1; 280/495; 411/85; 411/553; 403/348; 403/343

(58) Field of Classification Search
USPC .............. 280/416.1, 415.1, 495; 411/85, 553; 403/348, 449, 343
See application file for complete search history.

(56) References Cited

U.S. PATENT DOCUMENTS

| | | | |
|---|---|---|---|
| 3,561,076 A | 2/1971 | Gunther |
| 4,997,218 A | 3/1991 | Culling |
| 5,800,022 A | 9/1998 | Del Rosario |
| 5,839,745 A | 11/1998 | Cattau et al. |
| 6,065,766 A | 5/2000 | Pulliam |
| 6,467,791 B1 | 10/2002 | Fandrich et al. |
| 6,502,846 B2 | 1/2003 | Fandrich et al. |
| 6,533,308 B1 | 3/2003 | Tambornino |
| 6,685,210 B2 | 2/2004 | Lindenman et al. |

(Continued)

*Primary Examiner* — Joseph M Rocca
*Assistant Examiner* — Marlon Arce
(74) *Attorney, Agent, or Firm* — Shewchuk IP Services, LLP; Jeffrey D. Shewchuk

(57) ABSTRACT

An above-bed structure having two or more feet is attached into a bed of a truck using inserts which can be removed or retracted to provide a flat, unobstructed truck bed. Each insert includes an above-bed cleat portion and a below-bed peg portion which is received in a below-bed socket. Each insert is received first vertically without substantial rotation into its socket and then by rotation to a terminal point wherein the insert is vertically held by the socket. The above bed structure is then placed onto the inserts such that the feet mate with the inserts to prevent the inserts from rotating away from their terminal point, thus preventing the inserts from being removed from their sockets. The attachment can be completed by inserting mounting pins into aligned holes on the cleat portions and the feet. In one embodiment, the feet are supported on a bed place section of the insert which is offset from the rotational axis of the insert.

16 Claims, 6 Drawing Sheets

(56) References Cited

U.S. PATENT DOCUMENTS

| | | |
|---|---|---|
| 7,121,573 B2 | 10/2006 | Lindenman et al. |
| 7,234,905 B2 | 6/2007 | Warnock |
| 7,475,899 B2 | 1/2009 | Crawley |
| 7,543,837 B2 | 6/2009 | Crawley |
| 7,584,982 B2 | 9/2009 | Fisher |
| 7,793,968 B1 | 9/2010 | Withers |
| 7,828,317 B2 | 11/2010 | Withers et al. |
| 8,215,658 B2 | 7/2012 | Stanifer et al. |
| D668,187 S | 10/2012 | McCoy |
| 8,360,458 B2 | 1/2013 | Stanifer et al. |
| 8,414,009 B2 | 4/2013 | Stanifer et al. |
| D683,277 S | 5/2013 | McCoy |
| 8,439,387 B1 | 5/2013 | Connell |
| 2012/0145851 A1 | 6/2012 | McCoy |

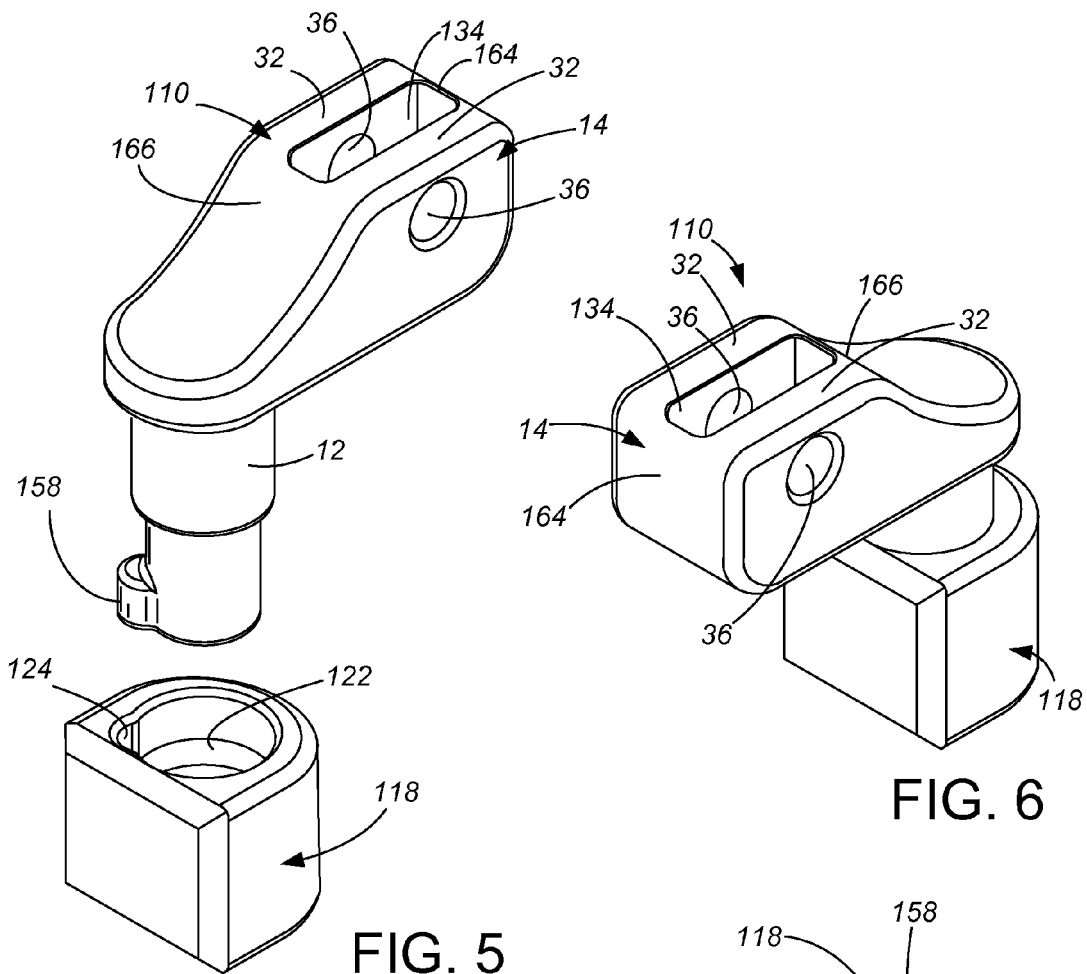
FIG. 5
FIG. 6
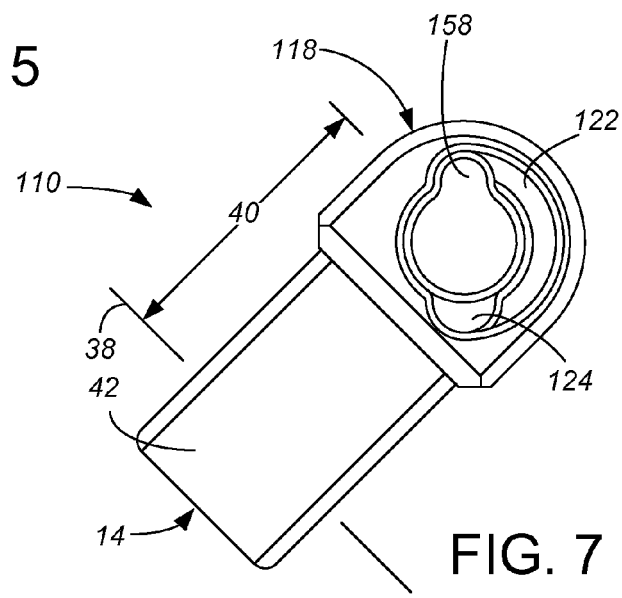
FIG. 7

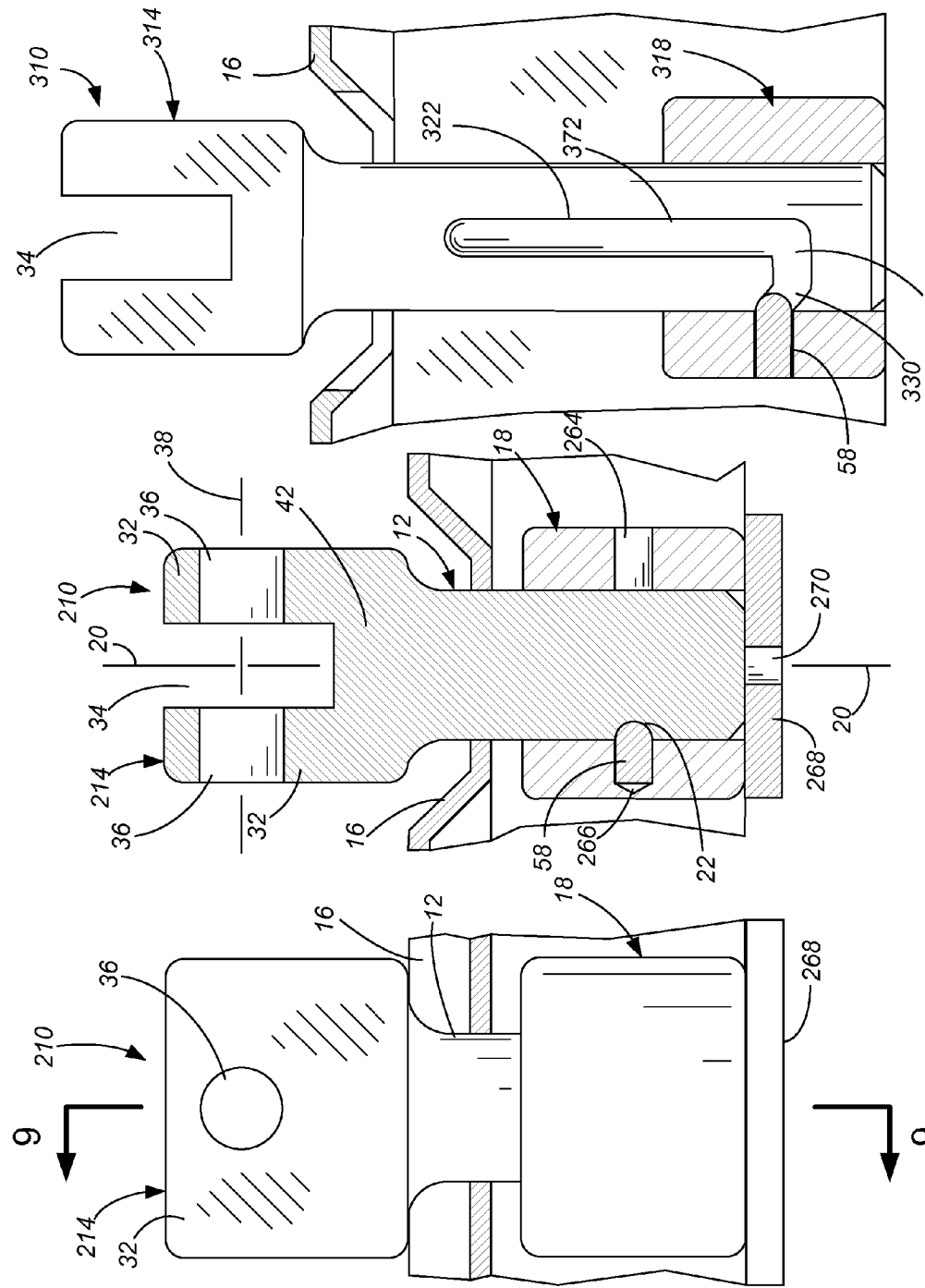

TRUCK BED HITCH ATTACHMENT

CROSS-REFERENCE TO RELATED APPLICATION(S)

The present application is a continuing application from U.S. application Ser. No. 13/205,438 entitled TRUCK BED HITCH ATTACHMENT filed Aug. 8, 2011, and claims priority from U.S. Provisional Application Nos. 61/371,577 entitled TRUCK BED HITCH ATTACHMENT filed Aug. 6, 2010, and 61/376,895 entitled OFFSET TRUCK BED HITCH ATTACHMENT filed Aug. 25, 2010, both incorporated herein by reference.

FIELD OF THE INVENTION

The present invention relates to hitch configurations or similar structures mounted in the bed of a pickup truck. In particular, the present invention applies to heavy duty towing segments which use underbed mount options for mounting in the bed of a pickup truck.

BACKGROUND OF THE INVENTION

Pick-up trucks have a bed which is used for hauling a wide variety of different things. For many hauling chores (such as carrying sheets of plywood or dry wall, for instance), the owner desires the bed of the pickup truck to present a relatively flat surface. Other chores use a structure, such as a fifth wheel hitch or a gooseneck hitch, which extends above the plane of the pick-up truck bed but is supported or attached through the pick-up truck bed to the underlying frame of the truck. Fifth wheel and gooseneck hitches are more stable than bumper-pull hitches because they are connected to the truck above the rear axle so that the added load of the trailer is applied to rear axle and the pivot of the trailer is at or slightly in front of the rear axle.

Often the bed mounted devices are attached at two or more locations down into the bed of the truck. Some owners desire to be able to switch between such uses, requiring a flat bed at some times and mounting something above the flat bed surface at other times. Accordingly, mounting structures extending above the flat bed surface are preferred to be retractable or easily removable to readily switch to a flat bed configuration.

The most common arrangements are bolted into threaded holes or anchors in or beneath the pick-up bed. Attaching the bolts requires multiple turns of the bolt (so the attachment is secured by multiple thread turns), commonly involving a specified torque applied to the bolts so the bolts don't vibrate loose but without stripping the threads.

More recently, removable/retractable attachment structures have been used which can be changed more quickly than bolted attachments. U.S. Pat. Nos. 6,467,791, 6,502,846, 7,121,573, 7,234,905, 7,793,968 and 7,828,317, all incorporated by reference, disclose examples of non-threaded mounting arrangements in the bed of the pick-up truck which can be quickly removed to provide a flat bed configuration. Mounting arrangements which are stronger, more reliable, less costly and/or easier to employ are needed.

BRIEF SUMMARY OF THE INVENTION

The present invention is a structure and method for attaching an above-bed structure having two or more feet into a bed of a truck, using inserts which can be removed or retracted to provide a flat, unobstructed truck bed. At least two, and more preferably four sockets are supported on the underbed frame. Each insert includes an above-bed cleat portion and a below-bed peg portion which is received in a socket. Each insert is received first vertically without substantial rotation into its socket and then by rotation to a terminal point wherein the insert is vertically held by the socket. The above bed structure is then placed onto the inserts such that the feet mate with the inserts to prevent the inserts from rotating away from their terminal point, thus preventing the inserts from being removed from their sockets. In a preferred embodiment, the above bed cleat portion defines a mounting pin hole which is offset from a rotational axis of the insert in the socket.

BRIEF DESCRIPTION OF THE DRAWINGS

FIG. 5 is a perspective view from above showing a second preferred embodiment of an offset attachment insert and socket in accordance with the present invention.

FIG. 6 is a perspective view showing the offset attachment insert of FIG. 5 locked into the socket.

FIG. 7 is a bottom view of the socket and offset attachment insert of FIG. 6.

FIG. 8 is a side view of an attachment insert in accordance with a third embodiment of the present invention.

FIG. 9 is a cross-sectional view taken along lines 9-9 in FIG. 8.

FIG. 10 is a side view of an attachment insert in accordance with a fourth embodiment of the present invention, showing the socket and bed floor in cross-section.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
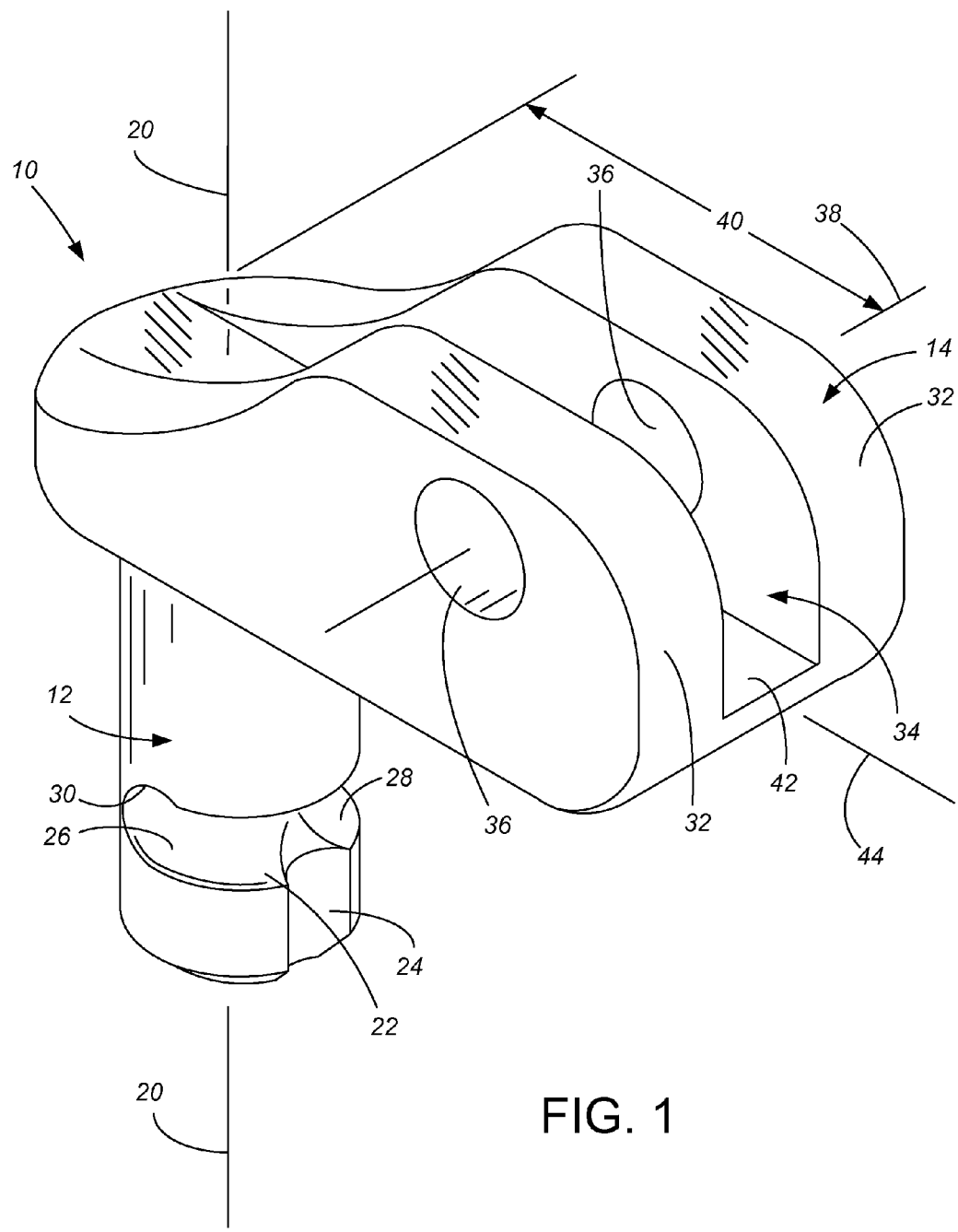
FIG. 1 is a perspective view from above showing a preferred embodiment of an offset attachment insert in accordance with the present invention.

FIG. 1 shows an offset attachment insert 10 in accordance with the present invention. In this preferred form, the insert 10 primarily consists of a peg portion 12 extending from a cleat portion 14. In most uses, the insert 10 is placed with the cleat portion 14 riding on or immediately above the relatively horizontal bed floor 16 (shown in FIG. 4) of the pickup truck, with the peg portion 12 extending beneath the horizontal plane of the bed 16 into a socket 18 (shown in FIGS. 2-4). The peg portion 12 defines a peg axis 20 which extends generally vertically, with the preferred peg portion 12 being mostly cylindrical other than having a locking channel 22 defined therein. In the preferred embodiment shown in FIG. 1, the groove or locking channel 22 has a "T" shape, including a vertically extending drop portion 24, and a clockwise extending rotation portion 26 and a counterclockwise extending rotation portion 28 joined to the upper end of the drop portion 24. In the preferred embodiment, each rotation portion 26, 28 terminates with a slight terminal recess 30 on its upper edge.

The preferred cleat portion 14 provides two attachment flanges 32 in a fork arrangement around an attachment slot 34. Each of the attachment flanges 32 has a mounting pin hole 36. The mounting pin hole 36 defines a mounting pin axis 38. In this embodiment, the mounting pin axis 38 has a horizontal offset 40 relative to the peg axis 20. A bed plate section 42 providing a relatively flat weight-bearing surface is between the attachment flanges 32 and below the mounting pin holes 36 to define the bottom of the attachment slot 34. If desired, the bed plate section 42 could be omitted, permitting the above-bed hitch structure to contact and ride directly on the bed 16 of the pickup truck. Including a bed plate section 42 on the insert 10 makes for a stronger fork and helps protect the bed 16 of the pickup truck by spreading out the weight (or other downward bearing force) of the foot 50 over a larger area as well as supporting some of the weight of the foot 50 with the socket 18.

In this embodiment, the center line 44 of the attachment slot 34 is in line with and intersects the peg axis 20, but the attachment slot 34 could alternatively be angled relative to the peg axis 20 for attaching other above-bed structures. This shape of cleat portion 14 is particularly appropriate for use in replacing the universal fifth wheel attachment base rails sold by Curt Manufacturing, Inc. of Eau Claire, Wis. as part number C16100, so the attachment slot 34 is just over ½ inch wide (such as 0.56 inches) and the mounting pin holes 36 are just over ½ inch in diameter. With the insert 10 formed of steel and the attachment flanges 32 each being about ½ inch thick, four of the inserts 10 can be used in fifth wheel hitch kits rated up to 24,000 lbs. Common feet 50 for above-bed hitch structure are formed of ½ inch thick plate steel, which mates into the 0.56" wide attachment slot 34 with 0.06" clearance.

Figure 2:
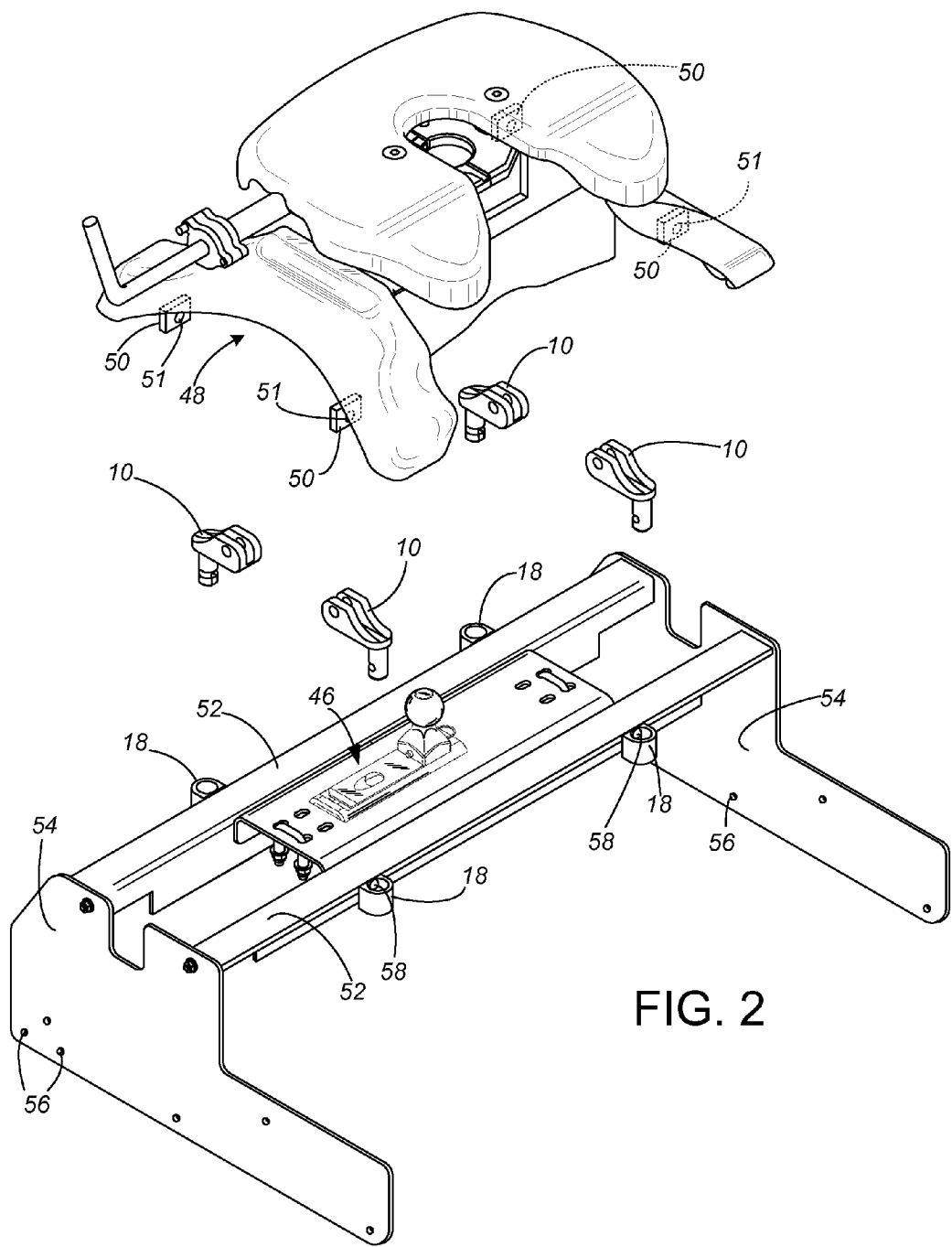
FIG. 2 is a first perspective assembly view showing an example of using four of the offset attachment inserts of FIG. 1 to attach an above bed fifth wheel hitch to the rails of a below bed folding ball gooseneck hitch.
Figure 3:
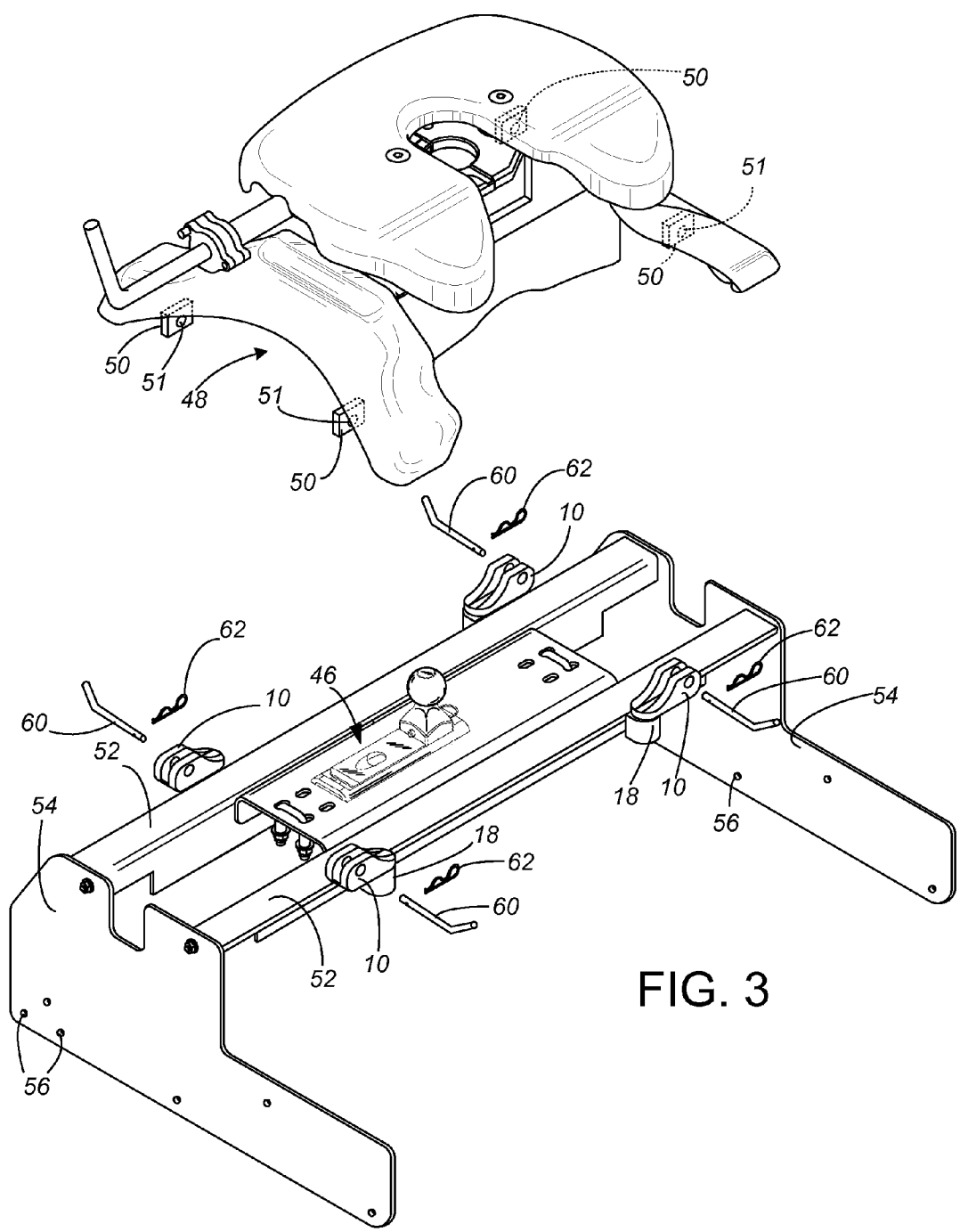
FIG. 3 is a second perspective assembly view, showing the attachment of FIG. 2 after the offset attachment structures have been lowered into the sockets and rotated to a secured position for the above bed fifth wheel hitch.

An example assembly view of such a use is shown in FIGS. 2 and 3. In this case, the under-bed support structure is selected to be similar to the structure disclosed in U.S. patent application Ser. No. 12/904,479, filed Oct. 14, 2010 and entitled "Fifth-Wheel Folding Hitch", incorporated by reference. This folding ball hitch 46 is commercially provided with a wide variety of install kits for different makes and models of pickup trucks. An under-bed support structure such as disclosed in U.S. Pat. No. 6,533,308, incorporated by reference, and numerous other types of under-bed support structures could alternatively be used.

The above-bed structure in this example is a fifth wheel hitch 48 disclosed in U.S. Pat. No. 7,475,899, incorporated by reference. The hitch 48 includes at least two, and in this case four feet 50, each of which is sized to be received in the attachment slot 34 of an insert 10. Feet 50 are largely shown in hidden lines in FIGS. 2 and 3, and their structural attachment to the rest of the above-bed structure is known in the art. Each foot 50 includes a mounting pin hole 51 which is generally the same size as the mounting pin holes 36 on the insert 10. Numerous other types of above-bed structures could alternatively be mounted using the inserts 10 of the present invention, such as the roller structure of U.S. Pat. No. 7,584,982, incorporated by reference, and many others. In the preferred embodiment shown in FIGS. 2 and 3, the feet 50 of the above-bed structure 48 define a rectangle of about 22×29 inches. However, essentially any above-bed structure having feet could be configured to be mounted in the bed 16 of the pickup truck using two or more inserts 10 of the present invention. While the terms "under-bed" and "above-bed" are used to describe these various components, it should be noted that the present invention can also be equivalently used on trucks without a bed 16.

The preferred underbed support structure includes two transverse support rails 52 extending between side mounting brackets 54 which are configured with holes 56 to mount to the underbed frame (not shown) of the pickup truck. Four sockets 18 for the peg portions 12 of the inserts 10 are mounted to the support rails 52, two from each rail 52 in a spaced rectangular configuration, such that in this embodiment the support rails 52 become part of the underbed frame for the sockets 18. The spacing for the four sockets 18 is selected to match with the desired above-bed mounting locations in a manner corresponding to the offset 40, as will be explained. For instance, in the preferred embodiment the sockets 18 are placed in a rectangular pattern spaced 22 inches in the fore-aft direction and spaced about 24¾ inches apart in the width-wise direction. For some applications (particularly light-weight applications), the sockets 18 could be used and mounted relative to the bed 16 of the pickup truck in other ways without even using the two support rails 52.

Each socket 18 has an interior shape which corresponds to the shape of the mating peg portion 12. The sockets 18 for the preferred inserts 10 thus each include a cylindrical hole having a diameter slightly larger than the outer diameter of the cylindrical peg portion 12. A lock projection 58 protrudes inward on the socket 18, with the lock projection 58 being of a size and position to mate with the locking channel 22 on the insert 10. In the preferred embodiment, the lock projection 58 is provided by a bullet dowel (one version being shown more clearly in the embodiment of FIG. 9).

The method of using the present invention can thus be understood with reference to FIGS. 2 and 3. First the folding ball hitch 46 is mounted in the bed of the pickup truck as known in the art. During installation of the folding ball hitch 46 into the pickup truck, the bed 16 of the pickup truck may be further cut or drilled such that the holes in the sockets 18 are accessible from above. The user aligns the vertically extending drop portions 24 of the locking channels 22 with the lock projections 58, which in this embodiment places the two fore inserts 10 with the attachment slot 34 oriented forward relative to the peg portion 12 and places the two aft inserts 10 with the attachment slot 34 oriented rearward relative to the peg portion 12. The user drops the insert 10 with its peg portion 12 downward into each of the sockets 18. Once dropped in place, the user then rotates each insert 90° about the peg axis 20, so the attachment slots 34 on the inserts 10 are at the desired position and orientation to mate with the feet 50 on the above-bed structure 48. In this preferred embodiment, the aft left and fore right inserts 10 are rotated counterclockwise, while the aft right and fore left inserts 10 are rotated clockwise (looking from above). The slight terminal recess 30 helps the user to know when the insert 10 has been fully rotated.

The user then places the above-bed structure 48 downward with each of the feet 50 within a corresponding attachment slot 34. The slight terminal recess 30 also helps the insert 10 to remain in its proper rotational position during lowering of the above-bed structure 48 into the attachment slots 34. Once all four feet 50 are in the slots 34, the above-bed structure 48 can be slid slightly to the left or the right so the mounting pin holes 51 in the feet 50 line up with the mounting pin holes 36 in the cleat portions 14.

As familiar in the art and as previously practiced using the C16100 base rails, the user secures each foot 50 by inserting a mounting pin 60 through the mounting pin holes 36, 51 in both the cleat portion 14 and the foot 50, and secures each mounting pin 60 in place with its cotter pin or hairpin clip 62. Once the inserts 10 are secured to their feet 50, the feet 50 on the above-bed hitch structure 48 prevent the inserts 10 from rotating away from their terminal point and thus prevent the inserts 10 from being removed from their sockets 18. As used herein, the term "terminal point" is used to indicate the location in the locking channel wherein the insert is rotated so the alignment recess (or similar structure) mates with the orientation of the base feet 50, which is not necessarily the location of the slight terminal recess 30 or the furthest point of rotational travel. While the preferred embodiments have an L or T shape, it should be noted that the horizontal portion of the locking channel could circumscribe the peg portion 12. The important consideration is that the vertically oriented portion of the locking channel not be circumferentially aligned with the final holding position of the insert. That is, the rotational orientation of the insert when it is lowered into or raised out of the socket (during at least part of the vertical travel) must be different than the rotational orientation of the insert when it is holding an above-bed hitch, and the locking channel can be made in any configuration that accomplishes this result.

At least two inserts 10 must support a single above-bed hitch structure 48. The inserts 10 only receive the above-bed hitch structure 48 when they are rotated to a position relative to the socket 18 that they cannot be raised or lowered, i.e., in this case when rotated until the lock projection 58 resides substantially at the terminal end of the horizontal portion 26, 28 of the "T" shaped locking channel 22. The above-bed hitch structure 48 then prevents all of the supporting inserts 10 from rotating out of their locked position. The inserts 10 thus jointly secure the above-bed hitch structure 48 in place because the above-bed hitch structure 48 prevents the inserts 10 from rotating, while any single insert 10, acting by itself, can be pulled out of the socket 18 simply by rotation and lifting.

In the preferred embodiment, the centerline 44 of the attachment slot 34 intersects the rotational axis 20 defined by the peg portion 12 (and the entire insert 10 has bilateral symmetry). Because the centerline 44 intersects the rotational axis 20 and with the orientation of the T-shaped locking channel 22, the insert 10 can be placed into the socket 18 and the rotated 90° in either direction. The "T" shape of the preferred locking channel 22 allows each insert 10 to be equivalently used in any of the four positions, despite the fact that two inserts 10 are rotated counterclockwise and two inserts 10 are rotated clockwise to their locked positions.

Figure 4:
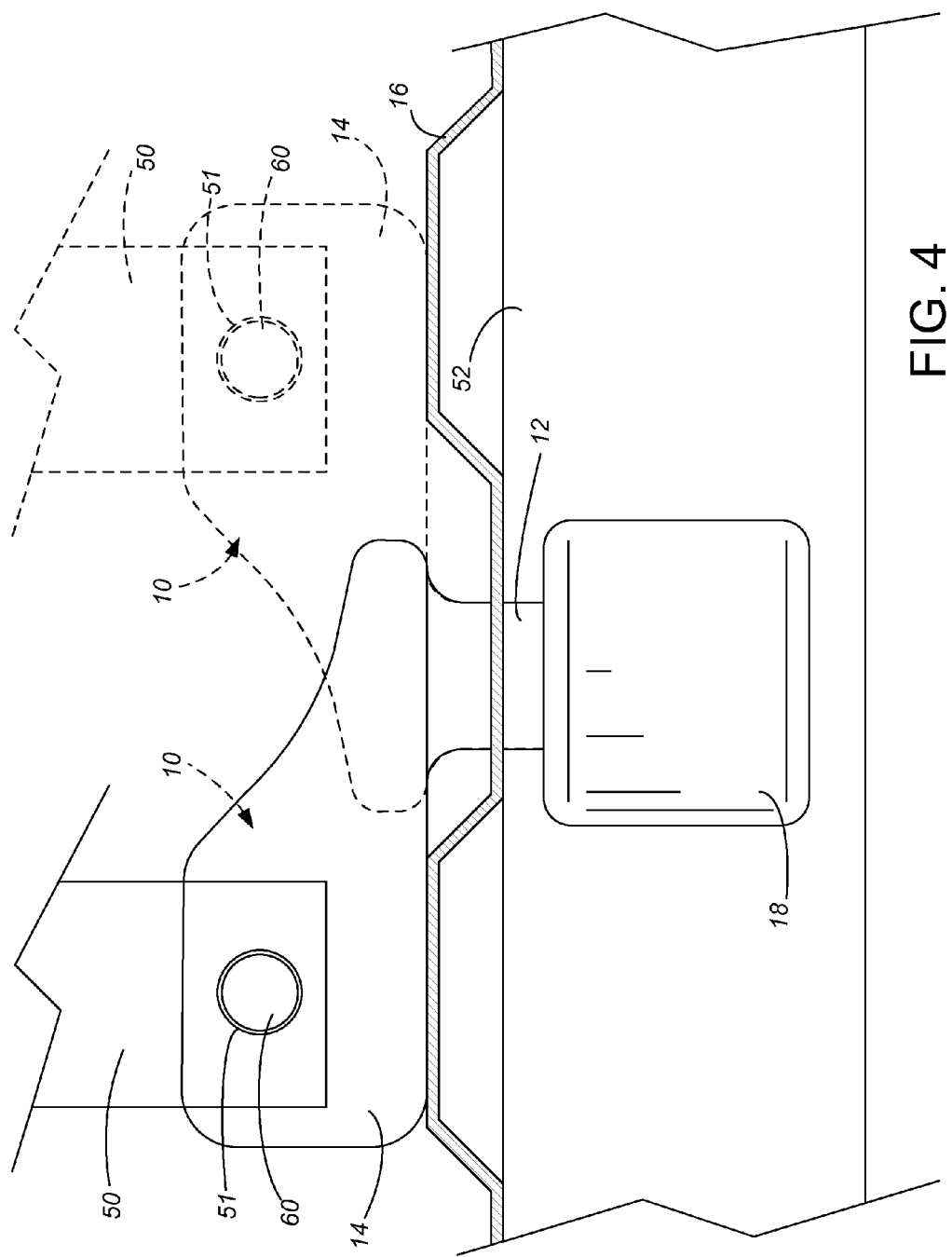
FIG. 4 is a side view, with the insert shown as transparent for better viewing of the foot, showing the versatility of the offset attachment insert of FIG. 1 to secure different above-bed structures.

The "T" shape of the preferred locking channel 22 provides an additional benefit, best seen with reference to FIG. 4. Namely, while the inserts 10 of FIG. 3 are all positioned with the attachment slots 34 at a stance wider than the sockets 18 (providing, in the preferred embodiment, attachment slots 34 in a roughly 22×29 inch rectangle), other above-bed structures can be attached with the attachment slots 34 in other positions. In the preferred embodiment, the offset 40 is about 2 inches. The top section of the T-shape provides two terminal locations for the insert 10 which are 180° apart to thereby provide equivalent pin holes 36 and attachment slots 34 at either of two locations spaced roughly 2+2=4 inches apart from the center of the socket 18. FIG. 4 shows in dashed lines a second position of the insert 10, wherein the attachment slot 34 is offset 4 inches relative to the solid line position. When the insert 10 is rotated far in one direction (clockwise when looking from above), the offset 40 of the insert 10 is about 2 inches to the left; when the insert 10 is rotated far in the other direction (counterclockwise when looking from above), the offset 40 of the insert 10 is about 2 inches to the right. This effectively provides four different mounting arrangements using the inserts 10, each to receive feet of the above-bed structure extending transverse to the direction of travel: a) a wide position (such as about 22×29 inch spacing), wherein all the attachment slots 34 are at a wider stance than the socket positions; b) a left position (such as about 22×25 inch spacing), wherein all the attachment slots 34 are left of the sockets 18; c) a right position (such as about 22×25 inch spacing), wherein all the attachment slots 34 are right of the sockets 18; and d) a narrow position (such as about 22×21 inch spacing), wherein all the attachment slots 34 are at a narrower stance than the sockets 18. This can allow a wider variety of above-bed and below bed structures to be used with the inserts 10 and sockets 18, i.e., above-bed structures which require a wider or narrower stance, and below-bed structures for particular models of pickup trucks which might restrict the permissible locations for the sockets 18.

Thus far we have been considering the flexibility provided by the inserts 10 when both the insert 10 has an attachment slot 34 in line with the pin axis 38 and when the feet 50 on the above-bed structure are transverse to the direction of travel. In other embodiments, one or both of these configurations can be changed. For instance, the feet on the above-bed structure could be aligned with the direction of travel, or the slot on the insert could be normal to the offset direction. In either arrangement, with the preferred inserts having an offset 40 of about 2 inches, such inserts could be used to mount a fifth wheel hitch with its feet either about 2 inches forward or about 2 inches behind the sockets 18, i.e., at forward and rearward locations spaced relative to the rear axle of the vehicle by about 4 inches. This flexibility is again useful for some models of vehicles wherein existing under-bed structures of the vehicle restrict the desired placement of the sockets and inserts.

Further flexibility benefits can be achieved such as by having a different embodiment of offset insert (not shown), with offsets in two directions, namely, offsets both relative to the rotation axis and relative to the alignment recess direction. For instance, the pin receiving openings of the feet of a different above-bed structure (not shown) could be spaced 14 inches in the fore-aft direction and spaced about 20.5 inches in the width-wise direction. A set of offset inserts could be built having an offset in the direction of the alignment slot of about 2⅛ inches and having an offset transverse to the direction of the alignment slot of about 2 inches, so the alignment slot was roughly at a 45° angle relative to a line between its location and the peg axis 20. Sockets could be positioned in a rectangular pattern spaced about 18 inches in the fore-aft direction and spaced about 24¾ inches in the widthwise direction and spaced. Then the doubly offset inserts could be used, rotated to an inside and short position, to hold the different above-bed structure (with about a 14×20½ inch base), or rotated to an outside and long position to hold the first existing (22×29) hitch base.

While the preferred embodiment includes a locking channel 22 in the insert 10 and a bullet dowel 58 extending to be received in the locking channel 22, that arrangement could easily be reversed. FIGS. 5-7 represent such an embodiment. The embodiment of FIGS. 5-7 has a projection 158 on the insert 110 extending radially outward to mate in a groove 122 provided in the socket 118. In this embodiment, the groove 122 is "L" shaped. From the position with the projection aligned with the vertical drop section 124 of the "L" shape 122 shown in FIG. 5, the insert 110 is rotated up to 180° to the locked position shown in FIGS. 6 and 7. Also in this embodiment, instead of an attachment slot 34 there is an attachment recess 134 which prevents the foot 50 from sliding sideways as well as securing the foot 50 from front to back. With the end walls 164, 166 on the attachment recess 134, initially dropping the above-bed structure into place requires more precision, but then the mounting pin holes 36 on the flanges 32 and the mounting pin holes 51 on the feet 50 always line up and there is no sliding of the above-bed structure 48 from side to side.

The insert 210 in the embodiment of FIGS. 8 and 9 includes the bullet dowel 58 of the embodiment of FIGS. 1-4, but in this case the cleat portion 214 does not include any offset 40, i.e., the axis 38 of the mounting pin hole 36 and the axis 20 of the peg 12 intersect. Without any offset 40, each foot 50 (shown in FIGS. 2 and 3) attaches in place directly in line over the socket 18. The direct in-line configuration requires the entirety of the weight of the above-bed structure 48 to be bourn by the socket 18 rather than transferring any of the weight to the bed floor 16.

FIG. 9 also shows an access hole 264 drilled in a side of the socket 18 for assembly placement of the bullet dowel 58 into a drilled hole 266 in the opposite side of the socket 18. While drilling a horizontal through hole 264 and adding a bullet dowel 58 is one method of manufacturing to create the projection, other methods are equally viable, such as casting or machining to define the profile of the insert 10, 110, 210 or socket 18, 118 with the projection 58, 158. As another example, the projection could be provided as a flat plate over a part of a cylindrical hole, with the locking channel provided as a mating flat on the distal end of one side of the peg portion followed by a circumferentially oriented groove.

The embodiment of FIGS. 8 and 9 also shows a different way of attaching the socket 18 relative to the underbed structure of the pickup truck, in this case wherein the socket 18 is fixed onto an underlying support plate 268. The support plate 268 preferably includes a drain hole 270 to prevent fluid such as rain water from occupying the hole in the socket 18 during outdoor use when the insert 210 is removed.

In the embodiments of FIGS. 1-9, the inserts 10, 110, 210 can be freely lifted out of the sockets 18, 118, making the inserts 10, 110, 210 more easily replaceable. To make the inserts 10, 110, 210 freely removable, the vertical portion 24, 124 of the locking channel 22, 122 extends fully through the bottom end of the peg portion 12 or top end of the socket 118. In another embodiment shown in FIG. 10, the socket 18 for the insert 310 can receive the insert 310 at two different supported heights, one wherein the cleat portion 314 of the insert 310 extends above the bed 16 as depicted in FIG. 10, and a second, stowed position wherein the cleat portion 314 of the insert 310 resides below the truck bed 16. Note that the opening through the truck bed 16 must be large enough for the cleat portion 314 to pass. The stowed position of the inserts 310 allows unobstructed access across the bed 16 of the truck without removing the inserts 310 from their sockets 318. In this preferred embodiment, the locking channel 322 of the insert 310 has a leg 372 extending upward from the horizontal portion 326 of the "L" shape, with the bullet dowel 58 residing in this upwardly extending leg 372 to enable the insert 310 to drop down. Additionally, the terminal recess 330 may be made more pronounced and angled, so the insert drops further into place and will not rotate away from the terminal point without being lifted to have the lock projection 58 clear the locking channel 322. In this case, the bullet dowel 58 is placed into position after assembly of the insert 310 in the socket 318, and the insert can only be fully removed from the socket 318 by first removing the bullet dowel 58. Alternatively, a further downwardly extending leg (not shown) may be added to the groove 322, at a different circumferential location than the terminal point, to enable the insert 310 to be removed from the socket 318.

The flexibility provided by the offset 40 can also be used beneficially to clear the sockets from underbed obstructions. That is, structure located underneath the bed in some makes/models of pickup trucks may make the desired placement of the sockets 18, 318 impossible. The sockets 18, 318 can be located at a possible unobstructed position nearby, and inserts used so the above-bed positioning of the hitch base pin holes can be obtained with the inserts. Inserts can be made with an offset 40 as sized for any particular vehicle, and thereby convert in a low cost solution to virtually any required underbed socket spacing.

The offset concept provides tremendous flexibility in use of the insert. Under the theory that any three nonlinear points define a circle, a single set of identical offset inserts could be used to mount three different sizes of hitch bases rather than only two. The design process would be to match circles to the bed locations of the three different hitch base foot prints. The sockets 18, 318 are positioned at the center of the matched circles, and the offset 40 is the radius of the matched circle. If used to mount three different sizes of hitch bases, the orientation of the base feet 50 and the pin hole 51 in the base feet 50 might need to be modified to match the orientation of the alignment recess. However, the important consideration is that the width and length between the base feet 50 locations is no longer determined by the locations of rails 52 (22 inches apart), or by the locations of obstructing underbed structure. Rather, the hitch designer is free to design the location of the base feet 50 for best structural performance and cost considerations of the hitch. The offset inserts can then be used to get from virtually any above-bed base feet spacing to virtually any underbed socket spacing, at a very low cost. Moreover, merely by using a second set of inserts with a different amount of offset 40, or by using inserts each with a different offset 40, the cleat locations can be spaced anywhere desired within the bed of the truck.

While the preferred embodiments have a fork with two legs or flanges 32, one in position to contact each side of the foot 50 of the hitch base, it should be noted that a similar result could be accomplished with only a single leg. The important consideration is that, when the hitch is secured, the base feet 50 must mate with the insert 10, 110, 210, 310 sufficiently to prevent the insert 10, 110, 210, 310 from rotating to its raising/lowering orientation.

Although the present invention has been described with reference to preferred embodiments, workers skilled in the art will recognize that changes may be made in form and detail without departing from the spirit and scope of the invention.

What is claimed is:

1. A truck bed hitch attachment, for use with a truck having a bed with an underbed frame and a plurality of sockets supported on the underbed frame, the truck bed hitch attachment comprising:

an insert for each of the plurality of sockets, each insert received first vertically without substantial rotation into its socket and then by rotation about a substantially vertical axis of rotation to a terminal point wherein the insert is vertically held by the socket, wherein each insert comprises a leg including at least one pin opening, the leg and pin opening extending above the bed when the insert is vertically held by the socket, the pin opening defining a pin axis which is offset from the axis of rotation;

an above bed hitch structure, held in place by the inserts, with the above bed hitch structure preventing the inserts from rotating away from their terminal point and thus preventing the inserts from being removed from their sockets, the above bed hitch structure including at least one pin opening which lines up with the pin opening of at least one insert when the above bed hitch structure is held in place;

a pin for extending simultaneously through the pin opening of at least one insert on its pin axis and through the pin opening of the above bed hitch structure, thereby holding the above bed hitch structure to the insert without having the pin intersect the axis of rotation of the insert.

2. The truck bed hitch attachment of claim 1, wherein each insert includes a fork with two legs, each leg including a pin opening, with the fork extending above the bed when the insert is vertically held by the socket.

3. The truck bed hitch attachment of claim 2, wherein at least one insert comprises a peg received in the socket below the bed, the peg and socket jointly defining an insert axis of rotation for the insert within the socket, wherein the fork is offset relative to the insert axis of rotation, such that the location of the fork in the truck bed moves when the insert is rotated in the socket.

4. The truck bed hitch attachment of claim 1, wherein the insert comprises a generally cylindrical peg defining a peg axis and a cleat portion above the cylindrical peg, the cleat portion including the pin opening.

5. The truck bed hitch attachment of claim 1, wherein the pin opening is substantially horizontal when the insert is in the socket.

6. The truck bed hitch attachment of claim 1, wherein the insert comprises a projection which mates with a groove on the socket.

7. The truck bed hitch attachment of claim 1, wherein at least part of the underbed frame is provided by a rail structure, wherein the rail structure supports a separate hitch mechanism.

8. A truck bed hitch attachment, for use with a truck having a bed with an underbed frame and a plurality of sockets supported on the underbed frame, the truck bed hitch attachment comprising:

an insert for each of the plurality of sockets, each insert received first vertically without substantial rotation into its socket and then by rotation about a substantially vertical axis of rotation to a terminal point wherein the insert is vertically held by the socket, wherein each insert comprises a leg including at least one pin opening, the leg and pin opening extending above the bed when the insert is vertically held by the socket, the pin opening being offset from the axis of rotation, wherein each insert includes a fork with two legs, each leg including a pin opening, with the fork extending above the bed when the insert is vertically held by the socket, wherein at least one insert comprises a peg received in the socket below the bed, the peg and socket jointly defining an insert axis of rotation for the insert within the socket, wherein the fork is offset relative to the insert axis of rotation, such that the location of the fork in the truck bed moves when the insert is rotated in the socket, wherein the insert comprises a "T" shaped groove on a cylindrical peg, and wherein the socket comprises a generally cylindrical hole mating with the cylindrical peg and a projection mating with the "T" shaped groove, wherein rotation of the insert in one (clockwise or counterclockwise) direction from its raising/lowering orientation moves the fork closer to a centerline of the truck, and wherein rotation of the insert in the opposite (clockwise or counterclockwise) direction from its raising/lowering orientation moves the fork further a centerline of the truck;

an above bed hitch structure, held in place by the inserts, with the above bed hitch structure preventing the inserts from rotating away from their terminal point and thus preventing the inserts from being removed from their sockets, the above bed hitch structure including at least one pin opening which lines up with the pin opening of at least one insert when the above bed hitch structure is held in place; and a pin for extending simultaneously through the pin opening of at least one insert and the pin opening of the above bed hitch structure, thereby holding the above bed hitch structure to the insert.

9. A truck bed hitch attachment, for use with a truck having a bed with an underbed frame and a plurality of sockets supported on the underbed frame, the truck bed hitch attachment comprising:

an insert for each of the plurality of sockets, each insert received first vertically without substantial rotation into its socket and then by rotation about a substantially vertical axis of rotation to a terminal point wherein the insert is vertically held by the socket, wherein each insert comprises a leg including at least one pin opening, the leg and pin opening extending above the bed when the insert is vertically held by the socket, the pin opening being offset from the axis of rotation, wherein each insert comprises:

a peg received in the socket below the bed, the peg and socket jointly defining an insert axis of rotation for the insert within the socket;

an above bed hitch structure, held in place by the inserts, with the above bed hitch structure preventing the inserts from rotating away from their terminal point and thus preventing the inserts from being removed from their sockets, the above bed hitch structure including at least one pin opening which lines up with the pin opening of at least one insert when the above bed hitch structure is held in place, wherein the above bed hitch structure comprises a foot having a pin opening which can be placed in alignment with the pin opening of the insert with the foot contacting the insert; and a pin for extending simultaneously through the pin opening of at least one insert and the pin opening of the above bed hitch structure, thereby holding the above bed hitch structure to the insert;

wherein rotation of the insert in the socket changes the distance from the pin opening to a centerline of the truck, such that the pin opening of the above bed hitch structure can be aligned with the pin opening of the insert in either of two width-wise positions without changing the fore-aft location of the foot.

10. A truck bed hitch attachment, for use with a truck having a bed with an underbed frame and a plurality of sockets supported on the underbed frame, the truck bed hitch attachment comprising:

an insert for each of the plurality of sockets, each insert received first vertically without substantial rotation into its socket and then by rotation about a substantially vertical axis of rotation to a terminal point wherein the insert is vertically held by the socket, wherein each insert comprises a leg including at least one pin opening, the leg and pin opening extending above the bed when the insert is vertically held by the socket, the pin opening being offset from the axis of rotation, wherein the insert comprises an "L" shaped channel on a cylindrical peg, and wherein the socket comprises a generally cylindrical hole mating with the cylindrical peg and a projection mating with the "L" shaped channel;

an above bed hitch structure, held in place by the inserts, with the above bed hitch structure preventing the inserts from rotating away from their terminal point and thus preventing the inserts from being removed from their sockets, the above bed hitch structure including at least one pin opening which lines up with the pin opening of at least one insert when the above bed hitch structure is held in place; and a pin for extending simultaneously through the pin opening of at least one insert and the pin opening of the above bed hitch structure, thereby holding the above bed hitch structure to the insert.

11. A method of attaching an above-bed hitch structure into a bed of a truck, comprising:

dropping a plurality of inserts from above the bed downward into a plurality of mating sockets, each of the sockets being supported under the plane of the truck bed;

rotating each insert within its mating socket to a terminal point wherein the insert is held from further vertical movement in the socket without rotation; and attaching an above-bed hitch structure to the inserts, the above-bed hitch structure including a plurality of feet which mate with the inserts and prevent the inserts from rotating, with the attachment securing the above-bed hitch structure in place in the bed of the truck;

wherein each insert comprises two flanges projecting from a bed plate section to define an attachment slot, wherein each foot sits on the bed plate section within the attachment slot.

12. A method of attaching an above-bed hitch structure into a bed of a truck, comprising:

dropping a plurality of inserts from above the bed downward into a plurality of mating sockets, each of the sockets being supported under the plane of the truck bed;

rotating each insert within its mating socket to a terminal point wherein the insert is held from further vertical movement in the socket without rotation; and attaching an above-bed hitch structure to the inserts, the above-bed hitch structure including a plurality of feet which mate with the inserts and prevent the inserts from rotating, with the attachment securing the above-bed hitch structure in place in the bed of the truck;

wherein each of the mating inserts and sockets include a projection which mates with a corresponding channel to hold the insert from further vertical movement in the socket without rotation.

13. An insert for attaching an above-bed hitch structure to a below-bed socket, the insert comprising:

an above-bed cleat portion defining a mounting pin hole with a mounting pin axis; and a below-bed peg portion projecting from the above-bed cleat portion and defining a peg axis of rotation, wherein the mounting pin axis is offset from the peg axis of rotation, the below-bed peg portion comprising one of a locking channel and a lock projection.

14. The insert of claim 13, wherein the below-bed peg portion comprises a locking channel having a vertically extending drop portion and a circumferentially extending rotation portion.

15. An insert for attaching an above-bed hitch structure to a below-bed socket, the insert comprising:

an above-bed cleat portion defining a mounting pin hole with a mounting pin axis, wherein the above-bed cleat portion comprises two flanges projecting from a bed plate section to define an attachment slot, with the mounting pin axis extending generally horizontally over the attachment slot; and a below-bed peg portion projecting from the above-bed cleat portion and defining a peg axis of rotation, wherein the mounting pin axis is offset from the peg axis of rotation, the below-bed peg portion comprising one of a locking channel and a lock projection.

16. The insert of claim 15, wherein the above-bed cleat portion comprises further end walls around the attachment slot such that attachment slot is provided as a rectangular recess above the bed plate section.

* * * * *